United States Patent
Katou

(10) Patent No.: US 8,708,499 B2
(45) Date of Patent: Apr. 29, 2014

(54) ILLUMINATING DEVICE AND PROJECTION DISPLAY DEVICE USING THE SAME

(75) Inventor: Atsushi Katou, Tokyo (JP)

(73) Assignee: NEC Display Solutions, Ltd., Minato-Ku, Tokyo (JP)

( * ) Notice: Subject to any disclaimer, the term of this patent is extended or adjusted under 35 U.S.C. 154(b) by 71 days.

(21) Appl. No.: 13/393,437

(22) PCT Filed: Sep. 2, 2009

(86) PCT No.: PCT/JP2009/065323
§ 371 (c)(1),
(2), (4) Date: Feb. 29, 2012

(87) PCT Pub. No.: WO2011/027428
PCT Pub. Date: Mar. 10, 2011

(65) Prior Publication Data
US 2012/0154755 A1  Jun. 21, 2012

(51) Int. Cl.
*G03B 21/28* (2006.01)
(52) U.S. Cl.
USPC ............. 353/20; 353/31; 353/98; 362/555; 362/561; 362/231
(58) Field of Classification Search
USPC .......... 353/20, 31, 34, 37; 348/742, 743, 771; 349/5–9; 362/555, 559, 561, 230, 231, 362/249.01
See application file for complete search history.

(56) References Cited

U.S. PATENT DOCUMENTS 6,795,243 B1 * 9/2004 McGettigan et al. .... 359/485.05
6,830,339 B2 * 12/2004 Maximus ................. 353/20
(Continued)

FOREIGN PATENT DOCUMENTS

CN  1847974 A  10/2006
JP  2000-206464 A  7/2000
(Continued)

OTHER PUBLICATIONS

International Search Report in PCT/JP2009/065323 dated Dec. 1, 2009 (English Translation Thereof).
(Continued)

*Primary Examiner* — William C Dowling
(74) *Attorney, Agent, or Firm* — McGinn IP Law Group, PLLC

(57) ABSTRACT

An illuminating device includes: light source (101); light guiding means (102) where light from light (101) is supplied to one end surface, and light incident from the one end surface is propagated inside to exit from the other end surface; illuminating optical systems (103 to 107) that form an optical image formed on the other end surface of light guiding means (102) on display element (22); reflective polarizing plate (109) that is located between illuminating optical systems (103 to 107) and display element (12), and transmits first polarized light while reflecting second polarized light whose polarized state is different from the first polarized light toward illuminating optical systems (103 to 107); phase plate (108) located between light guiding means (102) and reflective polarizing plate (109); and reflecting means (21) that is located on a side opposite the one end surface of light guiding means (102), and reflects, among lights by reflective polarizing plate (109), light incident via phase plate (108), illuminating optical systems (103 to 107), and light guiding means (102) toward the one end surface of light guiding means (102). The light emitting center of light source (101) is shifted from a center axis of light guiding means (102).

6 Claims, 12 Drawing Sheets

(56) References Cited

U.S. PATENT DOCUMENTS

| | | | |
|---|---|---|---|
| 6,927,910 B2 * | 8/2005 | Kang | 359/485.04 |
| 7,125,120 B2 * | 10/2006 | Aruga | 353/20 |
| 8,317,331 B2 * | 11/2012 | Li | 353/31 |
| 2003/0086066 A1 | 5/2003 | Kato | |
| 2006/0077353 A1 | 4/2006 | Wu | |
| 2006/0078266 A1 | 4/2006 | Wu et al. | |
| 2007/0252504 A1 | 11/2007 | Konno et al. | |

FOREIGN PATENT DOCUMENTS

| | | |
|---|---|---|
| JP | 2001-343611 A | 12/2001 |
| JP | 2003-202523 A | 7/2003 |
| JP | 2003-233032 A | 8/2003 |
| JP | 2005-099328 A | 4/2005 |
| JP | 2006-106682 A | 4/2006 |
| JP | 2006-106683 A | 4/2006 |
| JP | 2006-145578 A | 6/2006 |
| JP | 2006-227362 A | 8/2006 |
| JP | 2007-065550 A | 3/2007 |
| JP | 2007-101820 A | 4/2007 |
| JP | 2007-318066 A | 12/2007 |
| JP | 2008-065027 A | 3/2008 |
| JP | 2009-003444 A | 1/2009 |

OTHER PUBLICATIONS

Juan Manuel Teijido, et al., "Distinguished Paper: Compact Three Panel LED Projector Engine for Portable Applications". pp. 2011 to 2014, SID 06 Digest.

O.H. Willemsen, et al., "A Handheld Mini-Projector Using LED Light Sources" pp. 1706 to 1709, SID 05 Digest, 2005.

Hans Zou, et al., "Single-Panel LCoS Color Projector with LED Light Source" pp. 1698 to 1701, SID 05 Digest, 2005.

Chinese Search Report dated Dec. 30, 2013 with English Translation.

* cited by examiner

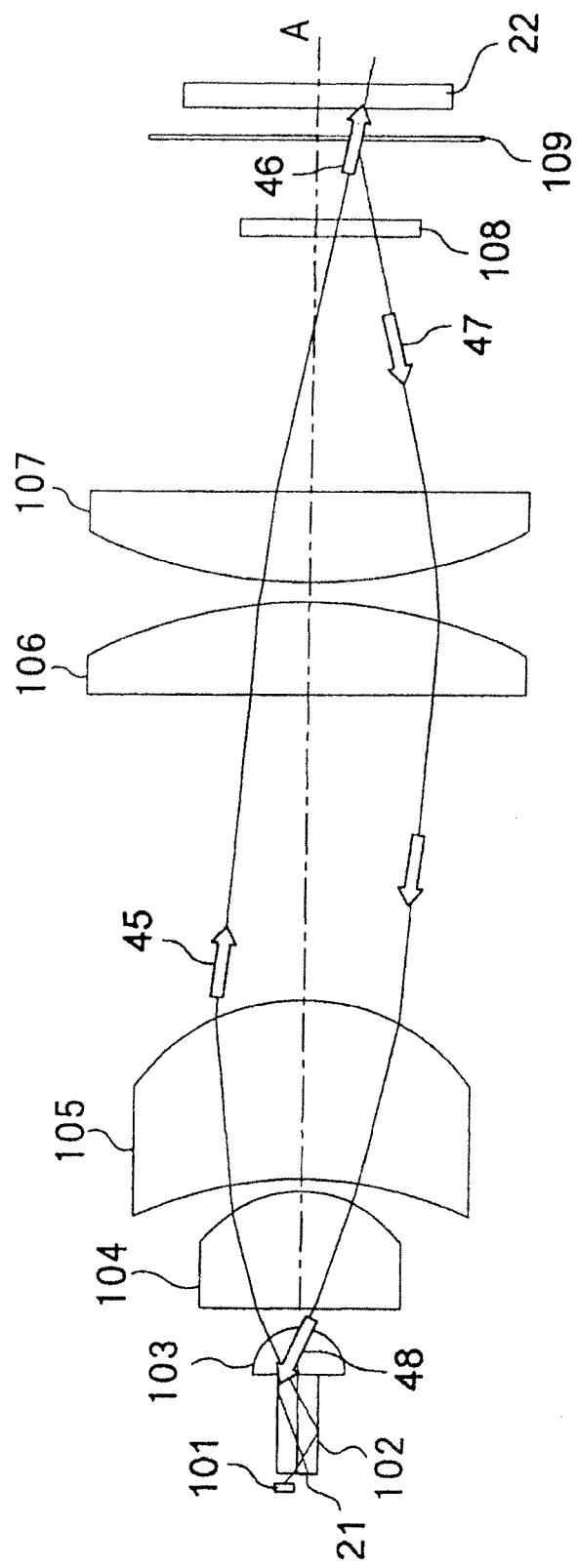

ILLUMINATING DEVICE AND PROJECTION DISPLAY DEVICE USING THE SAME

TECHNICAL FIELD

The present invention relates to an illuminating device of a projection display device represented by a liquid crystal projector, and more particularly to an illuminating device that illuminates a display element including a conversion element.

BACKGROUND ART

Patent Literatures 1 and 2 discuss a projector that uses a LED (Light Emitting Diode) as a light source for illuminating a DMD (Digital Micromirror Device) serving as a display element (Patent Literatures 1 and 2). The projector of this type is expected to reduce costs more than a projector that uses a white discharge lamp, and achieve performance including miniaturization, lower power consumption, and a wider color reproduction range.

There are also a projector that uses a single LCoS (Liquid Crystal on Silicon) element (Nonpatent Literature 1), and a projector that users three liquid crystal panels as display elements (Nonpatent Literatures 2 and 3).

In the liquid crystal projector, usually, a liquid crystal panel must be illuminated with polarized light. Generally, light from the LED is unpolarized light. Thus, when the LED is used as a light source for illuminating the liquid crystal panel, it is preferable that the light from the LED be converted into polarized light to increase light use efficiency.

For example, when a display panel is a TN liquid crystal (Twisted Nematic Liquid Crystal) panel, with respect to the unpolarized light from the LED which includes two linear polarized components which are orthogonal each other, one of linear polarized component is converted to be similar to the other polarized component. When efficiency of this polarizing conversion is low, the light use efficiency declines. When no polarizing conversion is carried out, about a half of the light is not used as illumination light.

In the projector described in Nonpatent Literature 1, a luminous flux from the LED that is the light source is roughly converted into parallel luminous fluxes by alight guiding member having a composite paraboloidal surface shape, which is referred to as a CPC reflector. The display panel is illuminated with the parallel luminous fluxes from the light guiding member.

A ¼ wavelength plate and a reflective polarizing plate are located in the traveling direction of the luminous flux from the light guiding member. For example, the polarizing plate transmits p-polarized light while reflecting s-polarized light. The s-polarized light reflected by the polarizing plate passes through the ¼ wavelength plate. The light (circular polarized light) passed through the ¼ wavelength plate returns to the LED to be reflected on a surface of the LED. The light reflected on the surface of the LED is converted parallel by the light guiding member, and then passes through the ¼ wavelength plate again.

A portion of the s-polarized light reflected by the polarizing plate, which has passed through the ¼ wavelength plate twice in the returning process to the LED and in the process of being reflected on the surface of the LED to travel toward the polarizing plate, is converted into p-polarized light.

In addition, there is an illuminating device discussed in Patent Literature 3. This illuminating device includes: a light source; a glass rod one end surface of which light from the light source enters; condensing means for condensing a luminous flux that has exited from the other end surface of the glass rod; and a PBS (Polarizing Beam Split(er)) polarizing conversion array disposed at a position where the condensing means forms a plurality of light source images.

The PBS polarizing conversion array is formed by alternately arranging first and second prisms in one direction. Each of the first and second prisms is a rectangular parallelepiped prism formed by bonding two rectangular prisms together.

The first prism includes a polarizing separation film formed on the bonded surface of the two rectangular prisms to transmit the p-polarized light while reflecting the s-polarized light, and is configured so that incident light can enter the polarizing separation film at an incident angle of about 45 degrees.

The second prism includes a reflecting film formed on the bonded surface of the two rectangular prisms, and is configured so that the s-polarized light reflected by the polarizing separation film of the first prism can enter the reflecting film at an incident angle of about 45 degrees. A surface of the second prism located in the traveling direction of the light reflected by the reflection film is an exit surface. A ½ wavelength plate for converting the s-polarized light into p-polarized light is formed on the exit surface. A light shielding plate is formed on a surface opposite the exit surface of the second prism.

The p-polarized light output from the first prism and the p-polarized light output from the second prism travel in the same direction. The condensing means is configured to form a light source image on an incident surface of the first prism.

CITATION LIST

Patent Literature

Patent Literature 1: JP2006-106683A
Patent Literature 2: JP2006-106682A
Patent Literature 3: JP2000-206464A

Nonpatent Literature

Nonpatent Literature 1: pp. 1698 to 1701, "Single-Panel LCoS Color Projector with LED Light Source" SID 05 DIGEST
Nonpatent Literature 2: pp. 1706 to 1709, "A Handheld Mini-Projector Using LED Light Sources" SID 05 DIGEST
Nonpatent Literature 3: pp. 2011 to 2014, "Compact Three Panel LED Projector Engine for Portable Applications" SID 06 DIGEST

SUMMARY OF INVENTION

However, the projector described in Nonpatent Literature 1 has the following problem.

The light of the polarized component reflected by the reflective polarizing plate efficiently returns to the surface of the LED. However, on the surface of the LED, only a part of the returned light is reflected toward the polarizing plate. Thus, a light loss occurs on the surface of the LED, thus preventing realization of high polarizing conversion efficiency.

The illuminating device described in Patent Literature 3 is difficult to be miniaturized because of the use of the PBS polarizing conversion array. For example, recent miniaturization of the display panel may require a pitch of each prism of the PBS polarizing conversion array to be about 1 millimeter.

When the first and second prisms are formed at such pitches, it is difficult to bond the ½ wavelength plate to the second prism.

In the future, the display panel is expected to be further miniaturized. Thus, the problem of miniaturization in the illuminating device that uses the PBS polarizing conversion array will become more pronounced.

It is an object of the present invention to provide a compact illuminating device capable of increasing light use efficiency by improving polarizing conversion efficiency, which can solve the above mentioned problems, and a projection display device that uses the same.

Solution to Problems

To achieve this object, an illuminating device according to the present invention includes:

a light source;

light guiding means where light from the light source is supplied to one end surface, and light incident from the one end surface is propagated inside to exit from the other end surface;

an illuminating optical system that forms an optical image formed on the other end surface of the light guiding means on a display element;

a reflective polarizing plate that is located between the illuminating optical system and the display element, and transmits first polarized light while reflecting second polarized light different in polarized state from the first polarized light toward the illuminating optical system;

a retardation plate located between the light guiding means and the reflective polarizing plate; and reflecting means that is disposed on a side opposite the one end surface of the light guiding means and that reflects, among lights reflected by the reflective polarizing plate, light incident via the retardation plate, the illuminating optical system, and the light guiding means toward the one end surface of the light guiding means. In this case, a center axis passing through a center of gravity of both end surfaces of the light guiding means matches an optical axis of the illuminating optical system, and a light emitting center of the light source is shifted from the center axis of the light guiding means.

A projection display device according to the present invention includes:

an illuminating device;

a display element illuminated with light from the illuminating device; and a projection optical system that projects image light from the display element.

In this case, the illuminating device includes: a light source;

light guiding means where light from the light source is supplied to one end surface, and light incident from the one end surface is propagated inside to exit from the other end surface;

an illuminating optical system that forms an optical image formed on the other end surface of the light guiding means on the display element;

a reflective polarizing plate that is located between the illuminating optical system and the display element, and transmits first polarized light while reflecting second polarized light different in polarized state from the first polarized light toward the illuminating optical system;

a retardation plate located between the light guiding means and the reflective polarizing plate; and reflecting means that is disposed on a side opposite the one end surface of the light guiding means and that reflects, among lights reflected by the reflective polarizing plate, light incident via the retardation plate, the illuminating optical system, and the light guiding means toward the one end surface of the light guiding means. In this case, a center axis passing through a center of gravity of both end surfaces of the light guiding means matches an optical axis of the illuminating optical system, and a light emitting center of the light source is shifted from the center axis of light guiding means.

BRIEF DESCRIPTION OF DRAWINGS

FIG. 4B is a schematic view showing a result of ray-tracing, among the lights emitted from the light source, light that is directed to a position away from the center of the display element in the illuminating device shown in FIG. 1.

Figure 1:
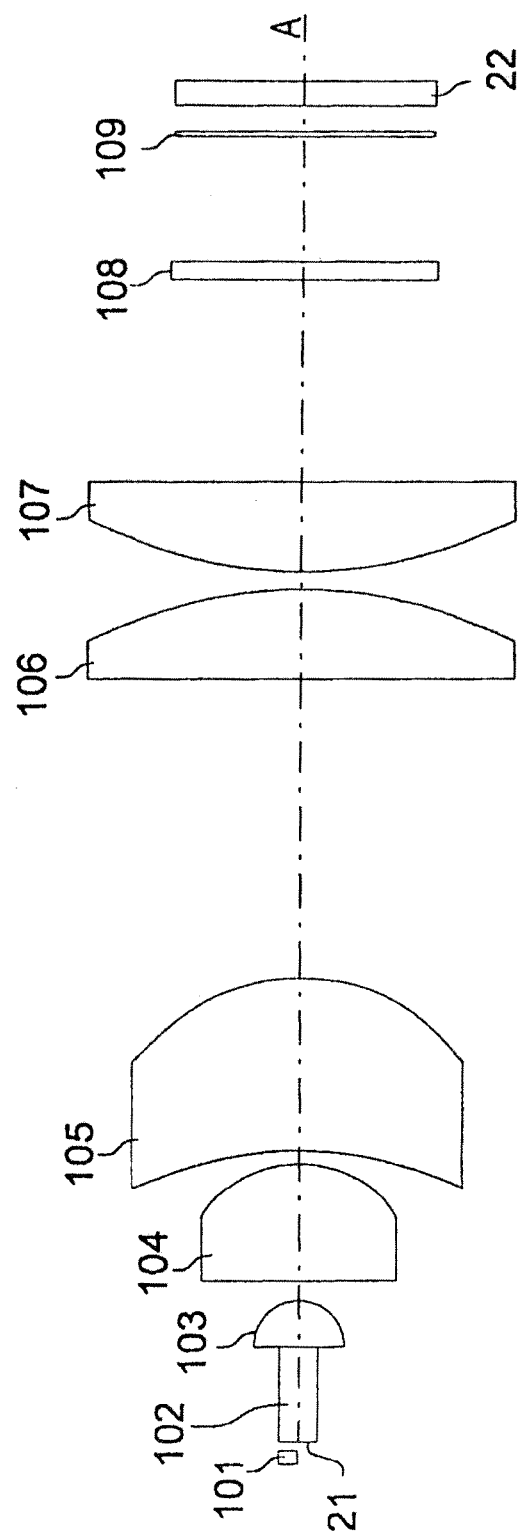
FIG. 1 is a schematic view showing a configuration of an illuminating device according to a first exemplary embodiment of the present invention.

EXPLANATION OF REFERENCE NUMERALS 21 reflecting film
22 display element
101 light source
102 light guiding rod
103 to 107 illumination lens
108 phase plate
109 reflective polarizing plate

DESCRIPTION OF EMBODIMENTS

Next, embodiments of the present invention are described with reference to the accompanying drawings.

First Exemplary Embodiment

FIG. 1 is a schematic view showing a configuration of an illuminating device according to a first exemplary embodiment of the present invention.

As shown in FIG. 1, the illuminating device according to the present embodiment, which illuminates display element 22 having reflective polarizing plate 109, includes, in addition to reflective polarizing plate 109, light source 101, light guiding rod 102, illumination lenses 103 to 107, and phase plate 108.

Reflective polarizing plate 109 is, for example, a polarizing plate of a wire-grid type, and configured to transmit, among incident lights, first polarized light (e.g., p-polarized light) while reflecting second polarized light (e.g., s-polarized light) whose polarized state is different from the first polarized light in a direction (toward light guiding plate 102) opposite the incident direction.

Display element 22 includes, for example, a liquid crystal panel. For both reflective polarizing plate 109 and display element 22, commercially available products can be used. As display element 22, for example, a transmissive liquid crystal panel having a diagonal of 1.0 inch can be used.

It is desired that reflective polarizing plate 109 be located near a display surface (panel surface) of display element 22. Reflective polarizing plate 109 can be formed integrally with display element 22. For example, when the liquid crystal panel is used as display element 22, reflective polarizing plate 109 can be formed integrally with the substrate of an incident side of the liquid crystal panel.

Light source 101 is a solid light source represented by, for example, a LED. Light from light source 101 is supplied to one end surface (incident surface) of light guiding rod 102. A light emitting center of light source 101 is not located on the optical axis A of the entire system including light guiding rod 102 and the illumination lens group including illumination lenses 103 to 107.

The light from light source 101 enters one of two areas of the incident surface of light guiding rod 102 divided by a straight line passing through the incident surface. The light that has entered light guiding rod 102 from light source 101 is propagated in light guiding rod 102 toward the other end surface (exit surface) to exit from the other end surface.

Figure 2A:
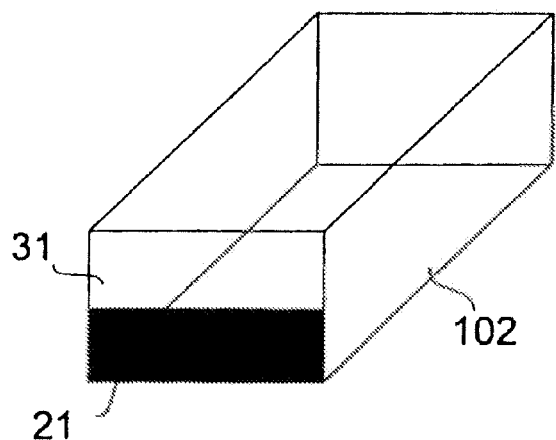
FIG. 2A is a schematic view showing an example of an incident surface of a light guiding rod and a reflecting film of the illuminating device shown in FIG. 1.
Figure 2B:
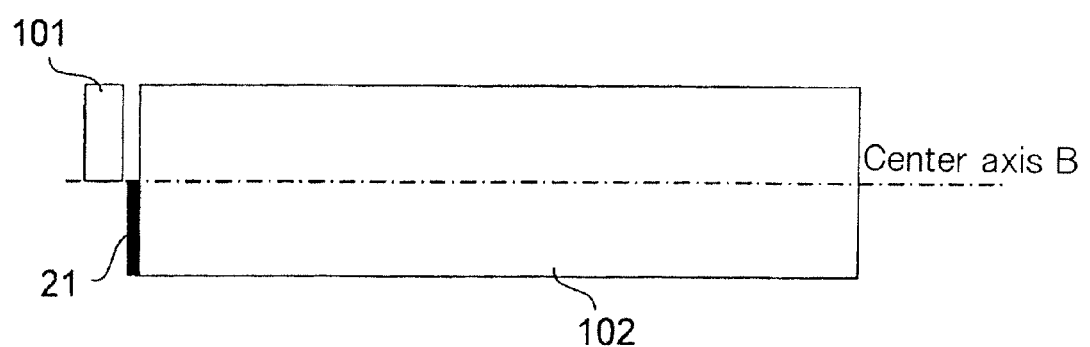
FIG. 2B is an explanatory schematic view showing a positional relationship between a light source and the light guiding rod in the illuminating device shown in FIG. 1.

FIG. 2A shows an example of the incident surface light guiding rod 102. FIG. 2B schematically shows a positional relationship between light source 101 and light guiding rod 102.

As shown in FIG. 2A, reflecting film 21 is formed in a region other than a region (opening 31) that causes light from light source 101 to enter the incident surface of light guiding rod 102. A part of light propagated from the exit surface side to the incident surface side in light guiding rod 102 is reflected by reflecting film 21. The light reflected by reflecting film 21 is propagated in light guiding rod 102 toward the exit surface to exit from the exit surface. Reflecting film 21 limits the light entering range (size of opening 31) of the incident surface of light guiding rod 102.

It is desired that opening 31 be set to a size equal to or larger than the area of the light emitting part of light source 101. It is desired that the shape of opening 31 be roughly similar to that of the light emitting part of light source 101. For example, when a LED having a rectangular light emitting part is used as light source 101, opening 31 is formed in a rectangular shape.

In the example shown in FIG. 2A, reflecting film 21 is formed by depositing aluminum (Al) on the incident surface of light guiding rod 102. However, the reflecting film is not limited to this forming method. Reflecting film 21 can be formed in a member (e.g., glass substrate) different from light guiding rod 102. In such a case, the member in which reflecting film 21 has been formed is located adjacently to the incident surface of light guiding rod 102. In this case, most of light output from the region other than opening 31 in the incident surface of light guiding rod 102 toward light source 101 reaches reflecting film 102. The light reflected by reflecting film 21 enters the region other than opening 31 in the incident surface of light guiding rod 102.

As shown in FIG. 2B, the light emitting part of light source 101 is located to face opening 31 of the incident surface of light guiding rod 102. The light emitting center of light source 101 is not located on an axis (center axis B) that passes through the center (center of gravity) of a section of light guiding rod 102. The center axis B of light guiding rod 102 matches the optical axis (optical axis A shown in FIG. 1) of the illumination lens group.

It is desired that the incident surface of light guiding rod 102 be set to a size twice as large or larger than the area of the light emitting part of light source 101. For example, when a LED having a light emitting part of 3 mm×8 mm is used, the incident surface of light guiding rod 102 is set to the size 6 mm×8 mm. In this case, opening 31 is set to the size 3 mm×8 mm. A high luminance LED capable of acquiring a large light output is commercially available, and a LED having a light emitting part of 3 mm×8 mm can be easily acquired.

To enter a greater amount of light from the LED to light guiding rod 102, it is preferred that the distance between the light emitting part of the LED and light guiding rod 102 be set as small as possible. Specifically, the distance between light guiding rod 102 and the LED is 0.7 millimeters.

Light guiding rod 102 is formed with a length that enables uniformization of luminance of the light from light source 101 and uniformization of luminance of the light reflected by reflecting film 21. For example, a length of light guiding rod 102 having an end surface of 6 mm×8 mm is about 20 millimeters.

Referring back to FIG. 1, illumination lenses 103 to 107, phase plate 108, reflective polarizing plate 109, and display element 22 are sequentially arranged in the traveling direction of the light output from the exit surface of light guiding rod 102. The centers (centers of gravity) of phase plate 108, reflective polarizing plate 109, and display element 22 are located on the optical axis A.

Illumination lenses 103 to 107 all have spherical shapes on one surface or on both surfaces. However, aspherical lenses can be used. An optical image formed on the exit surface of light guiding rod 102 is formed on a display surface of display element 22 by the illumination lens group including illumination lenses 103 to 107. In this case, a luminous flux of uniform luminance output from the exit surface of light guiding rod 102 is magnified by the illumination lens group to be applied to the entire display surface of display element 22.

Phase plate 108, which is a ¼ wavelength plate, is located between illumination lens 107 and reflective polarizing plate 109. The location of phase plate 108 is not limited between illumination lens 107 and reflective polarizing plate 109. Phase plate 108 can be located anywhere between light guiding rod 102 and reflective polarizing plate 109.

In the example shown in FIG. 1, the illumination lens group includes five illumination lenses 103 to 107. However, the illumination lens group is not limited to this. The illumination lens group can employ any lens configuration as long as the optical image formed on the exit surface of light guiding rod 102 can be expanded and formed on the display surface of display element 22.

Next, operation of the illuminating device according to the present exemplary embodiment is described in detail.

Unpolarized light from light source 101 enters light guiding rod 102 from opening 31 of its incident surface. In light guiding rod 102, the unpolarized light that has entered is repeatedly reflected on the rod inner surface to be propagated, and reaches the exit surface. During propagation process in the rod, luminance is made uniform. When there is luminance unevenness in the light emitted from light source 101, a uniform illuminance distribution is formed on the exit surface of light guiding rod 102 through luminance unifomization in light guiding rod 102.

Illumination information (secondary surface light source image that forms uniform illuminance distribution) formed on the exit surface of light guiding rod 102 is formed on the display surface (panel surface) of display element 22 by the illumination lens group including illumination lenses 103 to 107.

The luminous flux of the unpolarized light output from the exit surface of light guiding rod 102 is sequentially passed through illumination lenses 103, 104, 105, 106, and 107, and phase plate 108 to reach reflective polarizing plate 109. Reflective polarizing plate 109 transmits, of the luminous flux (unpolarized light) that has passed through phase plate 108, first linear polarized light (e.g., p-polarized light) while reflecting second linear polarized light (e.g., s-polarized light) toward phase plate 108.

The first linear polarized light transmitted through reflective polarizing plate 109 is applied to the display surface (display panel) of display element 22. On the other hand, the second linear polarized light (s-polarized light) reflected by reflective polarizing plate 109 is sequentially passed through phase plate 108 and illumination lenses 107, 106, 105, 104, and 103 to enter the exit surface of light guiding rod 102.

Most of the reflected light from reflective polarizing plate 109, which has entered the exit surface of light guiding rod 102, is propagated while being repeatedly reflected on the rod inner surface to reach reflecting film 21 formed on the incident surface. In this case, a new light source (surface light source image) is formed on reflecting film 21.

Figure 3A:
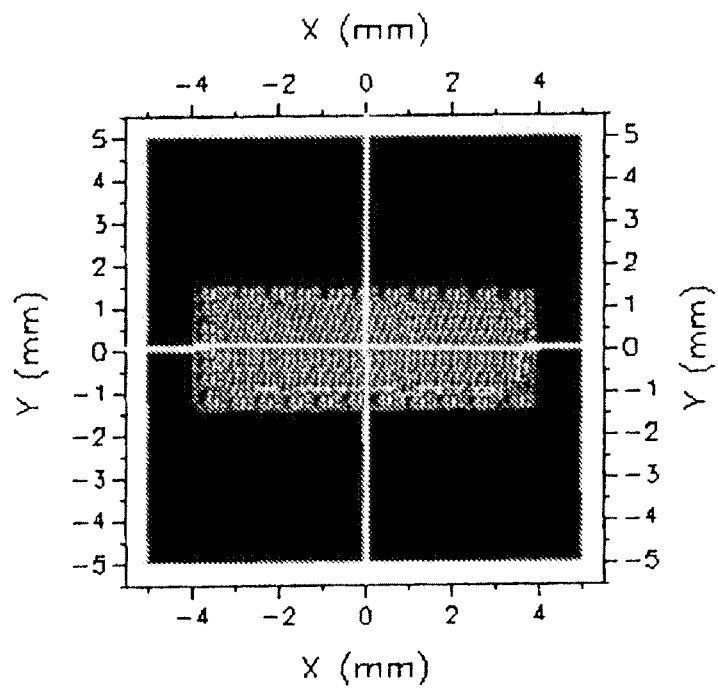
FIG. 3A is an explanatory view showing an illuminance profile when light from a reflective polarizing plate reaches the reflecting film formed on the incident surface of the light guiding rod in the illuminating device shown in FIG. 1.

FIG. 3A shows an illuminance profile when the reflected light from reflective polarizing plate 109 reaches reflecting film 21. In FIG. 3A, a Y axis corresponds to a vertical direction (up-and-down direction) shown in FIG. 2A, and an X axis corresponds to a horizontal direction (left-and-right direction) shown in FIG. 2A. In the Y axis and the X axis, the position of the center (center of gravity) of the film surface of reflecting film 21 is 0. As shown in FIG. 3A, the new light source (surface light source image) is formed on reflecting film 21.

Figure 3B:
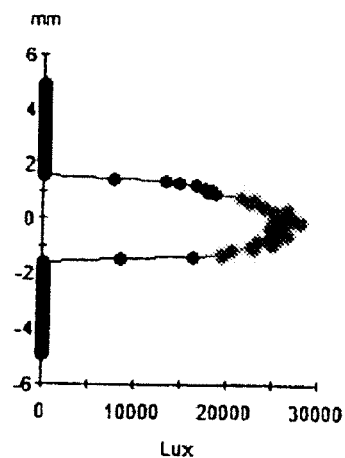
FIG. 3B is a characteristic view showing a change of luminance in a Y axis direction when a value in an X axis is 0 in the illuminance profile shown in FIG. 3A.
Figure 3C:
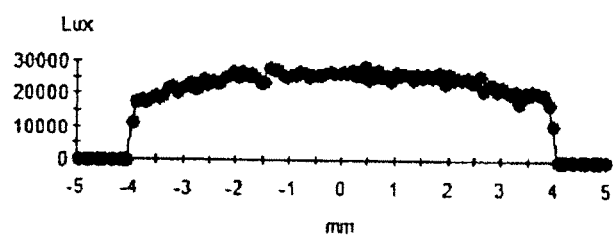
FIG. 3C is a characteristic view showing a change of luminance in the X axis direction when a value in the Y axis is 0 in the illuminance profile shown in FIG. 3A.

FIG. 3B is a characteristic view showing a change of luminance in the Y axis direction when a value in the X axis is 0 in the illuminance profile shown in FIG. 3A. FIG. 3C is a characteristic view showing a change of luminance in the X axis direction when a value in the Y axis is 0 in the illuminance profile shown in FIG. 3A. As can be understood from these characteristic views, the new light source (surface light source image) on reflecting film 21 has an illuminance distribution where luminance of the center is higher than those of other parts.

The light reflected by reflecting film 21 enters the rod from the incident surface of light guiding rod 102. The reflected light from reflecting film 21 is repeatedly reflected on the rod inner surface to be propagated, and reaches the exit surface of light guiding rod 102. This is equivalent to the process where the light from the new light source formed on reflecting film 21 is repeatedly reflected on the rod inner surface to be propagated, and reaches the exit surface of light guiding rod 102. During the propagation process in the rod, luminance of the light from the new light source is made uniform. Thus, when there is luminance unevenness in the new light source, a uniform illuminance distribution is formed for the new light source on the exit surface of light guiding rod 102 through luminance uniformization in light guiding rod 102.

Most of the light, that is reflected by reflective polarizing plate 109 to return to reflecting film 21, is reflected toward reflective polarizing plate 109 by reflecting film 21. The luminance flux (circular polarized light) from the new light source, which has been output from the exit surface of light guiding rod 102, is sequentially passed through illumination lenses 103, 104, 105, 106 and 107 and phase plate 108 to reach reflective polarizing plate 109.

Among lights reflected by reflective polarizing plate 109, light that has twice passed through phase plate 108 (¼ wavelength plate) during the process of reaching reflecting film 21 from reflective polarizing plate 109 and during the process of reaching reflective polarizing plate 109 from reflecting film 21, becomes linear polarized light where the polarizing direction changes by 90 degrees as compared with the polarizing direction when light is reflected by reflective polarizing plate 109. Thus, most of the luminous flux (circular polarized light) from reflecting film 21 is converted into first polarized light (p-polarized light) at phase plate 108. The first polarized light (p-polarized light) is passed through reflective polarizing plate 109 to reach display element 22.

Figure 4A:
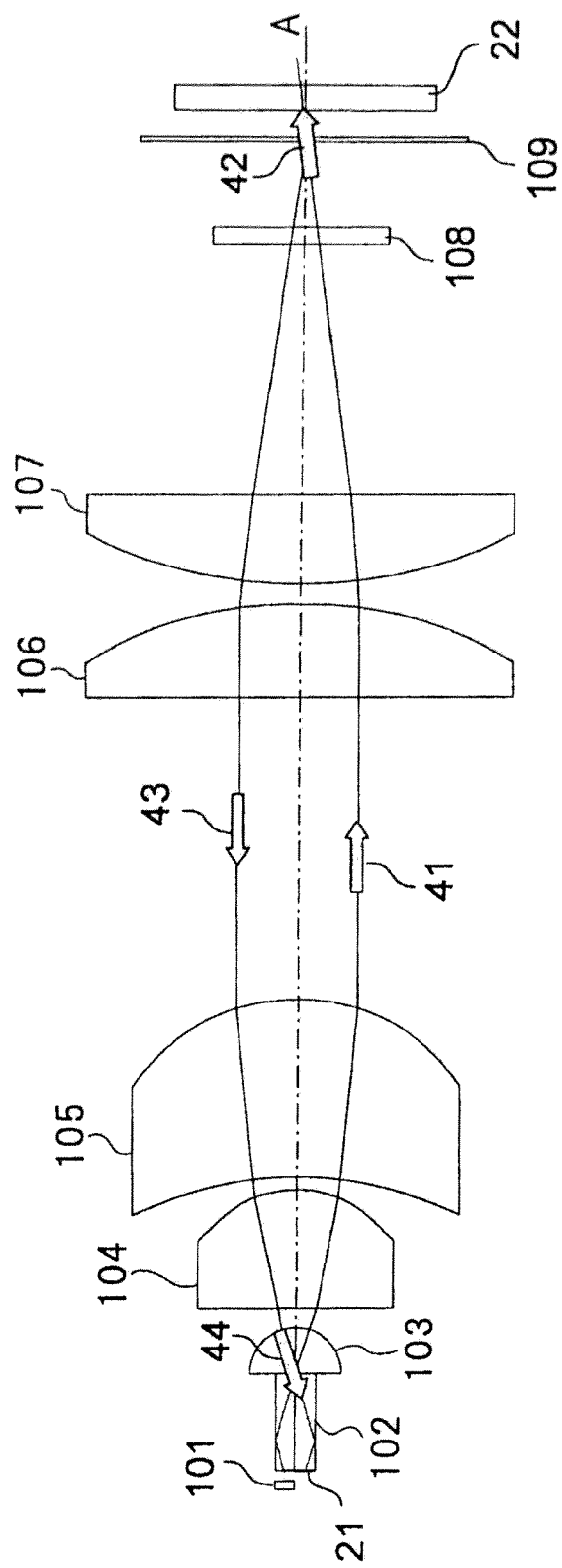
FIG. 4A is a schematic view showing a result of ray-tracing, among lights that are emitted from the light source, light that is directed to a center of a display element in the illuminating device shown in FIG. 1.

FIG. 4A shows a result of ray-tracing, among lights that are emitted from light source 101, light that is directed to the center of display element 22. In FIG. 4A, solid-line arrows 41 and 42 indicate the optical path of, among the lights emitted from light source 101, rays that reach the center of display element 22. Solid-line arrows 43 and 44 indicate the optical path of, among the rays directed to the center of display element 22, rays reflected by reflective polarizing plate 109.

As shown in FIG. 4A, among the rays directed to the center of display element 22, the first polarized light (e.g., p-polarized light) is transmitted through reflective polarizing plate 109 to reach display element 22, while the second polarized light (e.g., s-polarized light) is reflected by reflective polarizing plate 109. The reflected light from reflective polarizing plate 109 is passed through the optical path indicated by arrows 43 and 44 to enter the exit surface of light guiding rod 102. The light incident on the exit surface of light guiding rod 102 is propagated in the rod to reach reflecting film 21.

FIG. 4B shows the result of ray-tracing, among the lights emitted from light source 101, light that is directed to a position away from the center of display element 22. In FIG. 4B, solid-line arrows 45 and 46 indicate the optical path of, among the lights emitted from light source 101, rays that reach the position away from the center of display element 22. Solid-line arrows 47 and 48 indicate the optical path of, among the rays directed to the position away from the center of display element 22, rays reflected by reflective polarizing plate 109.

As shown in FIG. 4B, among the rays emitted from light source 101 and directed to the position away from the center of display element 22, the first polarized light (e.g., p-polarized light) is transmitted through reflective polarizing plate 109 to reach display element 22, while the second polarized light (e.g., s-polarized light) is reflected by reflective polarizing plate 109. The reflected light from reflective polarizing plate 109 is passed through the optical path indicated by arrows 47 and 48 to enter the exit surface of light guiding rod 102. The light incident on the exit surface of light guiding rod 102 is propagated in the rod to reach reflecting film 21.

As can be understood from the examples shown in FIG. 4A and FIG. 4B, most of the light reflected by reflective polarizing plate 109 reaches reflecting film 21. This is due to a conjugate relationship between the exit surface of light guiding rod 102 and the display surface (panel surface) of display element 22 which are positioned on both sides (incident side and exit side) of the lens group including illumination lenses 103 to 107 and due to shifting of the center of the light emitting part of the light source 101 from the optical axis A of the optical system Thus, according to the illuminating device of the present embodiment, the light reflected by reflective polarizing plate 109 is efficiently returned to reflecting film 21, and the light reflected by reflecting film 21 is used as illumination light again. This increases polarizing conversion efficiency to improve light use efficiency.

Reflecting film 21 is formed by deposition. Such reflecting film 22 facilitates miniaturization more than the PBS polarizing conversion array. Thus, according to the illumination device of the present embodiment, the problem of miniaturization of the device that is unachievable by the PBS polarizing conversion array can be solved.

Next, a projection display device that includes the illuminating device according to the first embodiment is described.

Figure 5:
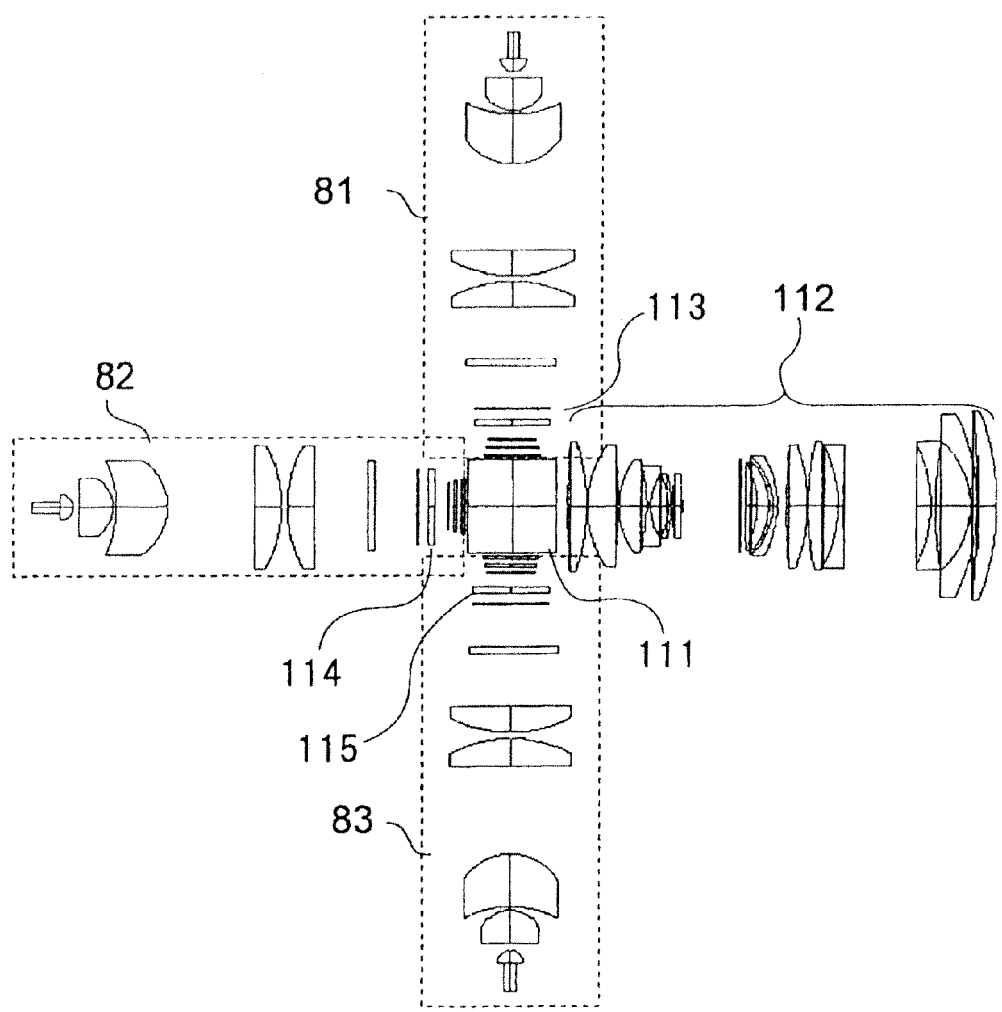
FIG. 5 is a schematic view showing an example of a projection display device to which the illuminating device shown in FIG. 1 is applied.

FIG. 5 shows an example of the projection display device. The main portion of the projection display device, which is a three-plate liquid crystal projector, includes illuminating devices 81 to 83, cross dichroic prism 111, projection optical system 112, and liquid crystal panels 113 to 115.

Illuminating devices 81 to 83 include components similar to those (light source 101, light guiding rod 102, illumination lenses 103 to 107, phase plate 108, reflective polarizing plate 109, and reflecting film 21) of the illuminating device according to the first exemplary embodiment.

For the light source of illuminating device 81, a solid light source having a peak wavelength in a red wavelength band is used. For the light source of illuminating device 82, a solid light source having a peak wavelength in a green wavelength band is used. For the light source of illuminating device 83, a solid light source having a peak wavelength in a blue wavelength band is used. The blue, green, and red colors correspond to three primary colors of light. The solid light source is, for example, a LED.

Colored light (red) of predetermined polarized light (p-polarized light or s-polarized light) output from illuminating device 81 is applied to liquid crystal panel 113. Colored light (green) of predetermined polarized light (p-polarized light or s-polarized light) output from illuminating device 82 is applied to liquid crystal panel 114. Colored light (blue) of predetermined polarized light (p-polarized light or s-polarized light) output from illuminating device 83 is applied to liquid crystal panel 115.

Cross dichroic prism 111 is located at the intersection point of optical axes of illuminating devices 81 to 83. Cross dichroic prism 111 includes the first incident surface which image light (red) from liquid crystal panel 113 enters, the second incident surface which image light (green) from liquid crystal panel 114 enters, the third incident surface which image light (blue) from liquid crystal panel 115 enters, and the exit surface from which color synthesized image light synthesizing colors of the image lights (red, green, and blue) incident from the incident surfaces exits.

Projection optical system 112 projects the color synthesized image light from cross dichroic prism 111 on a screen (not shown). The pupil of projection optical system 112 is set in a focal position of each of the optical systems (illumination lenses 103 to 107 shown in FIG. 1) of illuminating devices 81 to 83. In other words, the optical system of each of illuminating devices 81 to 83 and projection optical system 112 constitute a telecentric system.

Figure 6:
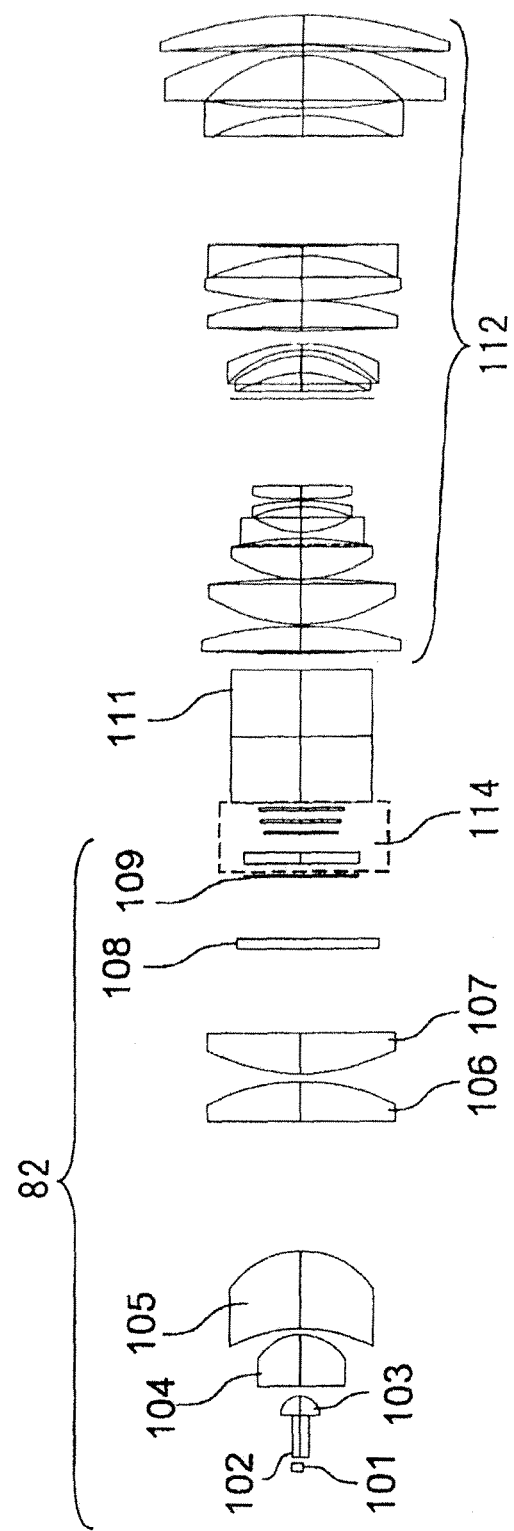
FIG. 6 is a schematic view showing a partial system of the projection display device shown in FIG. 5.

FIG. 6 shows illuminating device 82, liquid crystal panel 114, cross dichroic prism 111, and projection optical system 112.

As shown in FIG. 6, illuminating device 82 includes light source 101, light guiding rod 102, illumination lenses 103 to 107, phase plate 108, and reflective polarizing plate 109. Though not shown in FIG. 6, reflecting film 21 is formed on an incident surface of light guiding rod 102 as shown in FIG. 1.

Figure 7A:
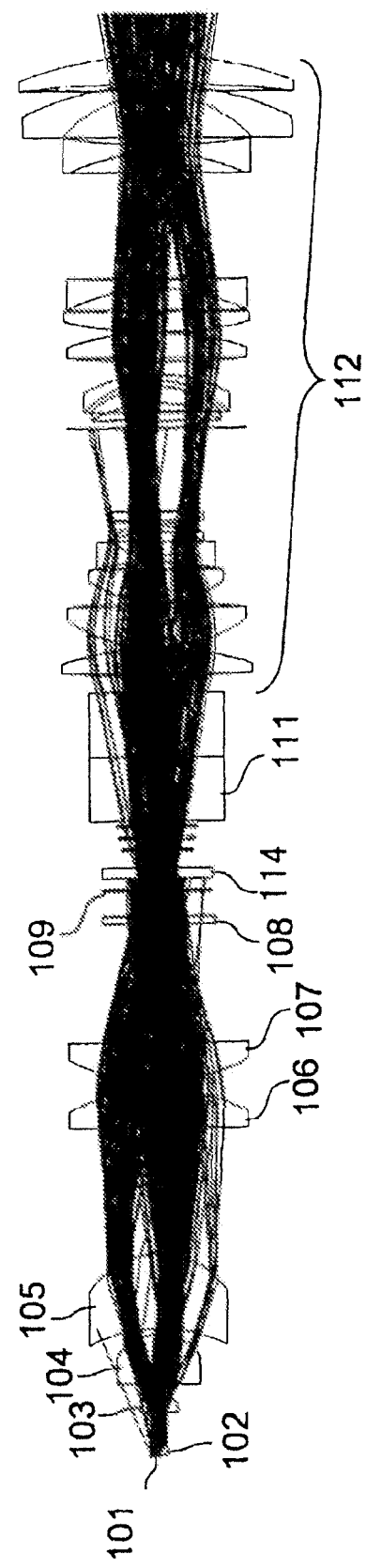
FIG. 7A is a schematic view showing a result of ray-tracing, among the lights emitted from the light source to a display panel, a path of light of a linear polarized component that is transmitted through the reflective polarizing plate in the system shown in FIG. 6.

FIG. 7A shows the result of ray-tracing, among lights emitted from light source 101 to liquid crystal panel 114, a path of light of a linear polarized component that is transmitted through reflective polarizing plate 109 in the system shown in FIG. 6. As shown in FIG. 7A, the light of the linear polarized component that has transmitted through reflective polarizing plate 109 is applied to liquid crystal panel 114 to be used as light for image projection.

Figure 7B:
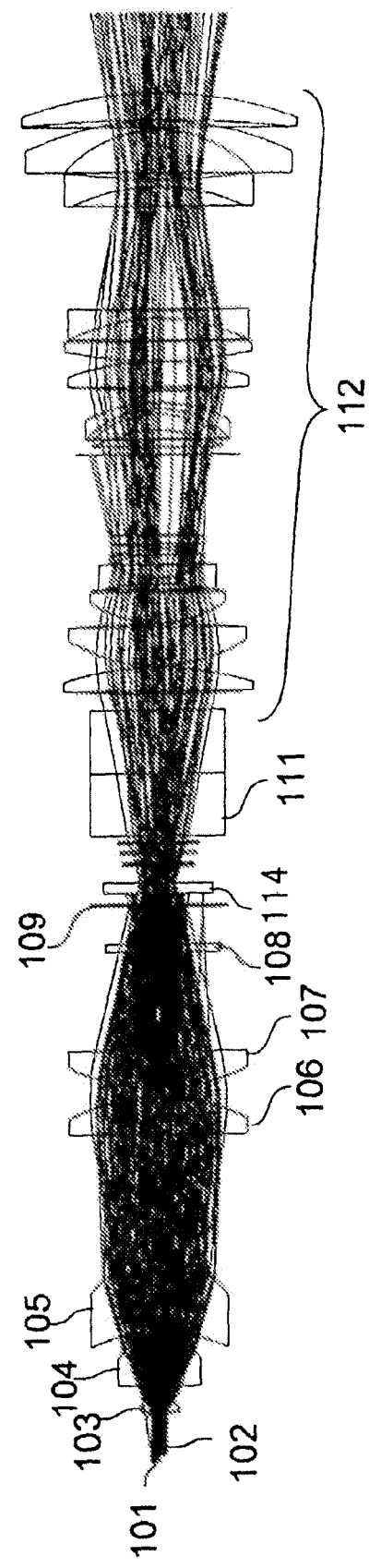
FIG. 7B is a schematic view showing a result of ray-tracing a process of forming a new light source on the reflecting film by the light of the linear polarized component reflected by the reflective polarizing plate, and polarizing and converting light from the new light source to transmit it through the reflective polarizing plate in the system shown in FIG. 6.

FIG. 7B shows the result of ray-tracing a process of forming a new light source on reflecting film 21 by the light of the linear polarized component reflected by reflective polarizing plate 109, and polarizing and converting light from the new light source to transmit it through reflective polarizing plate 109 in the system shown in FIG. 6.

As shown in FIG. 7B, the light reflected by reflective polarizing plate 109 efficiently returns to reflecting film 21. This is achieved by a conjugate relationship between the exit surface of light guiding rod 102 and liquid crystal panel 114 which are positioned on the incident side and the exit side of the optical system of illumination lenses 103 to 107 and by shifting of the center of the light emitting part of light source 101 from the center axis of light guiding rod 102.

In Particular, causing the light from light source 101 to enter one of two regions of the incident surface of light guiding rod 102 by a straight line that passes through the center of gravity of the incident surface and causing the formation of reflecting film 21 on the other surface enables most of the reflected light from reflective polarizing plate 109 to return to reflecting film 21.

In this case, about one half of the region of the incident surface of light guiding rod 102 is used as a region for forming a new light source by the reflected light from reflective polarizing plate 109, and hence a sufficient region can be secured to form a new light source.

Among lights from the new light source formed on reflecting film 21 by the reflected light from reflective polarizing plate 109, light of a linear polarized component transmitted through reflective polarizing plate 109 is applied to liquid crystal panel 114 to be used as light for image projection.

Thus, the overall polarizing conversion efficiency can be improved by efficiently returning the light reflected by reflective polarizing plate 109 to reflecting film 21.

Figure 8A:
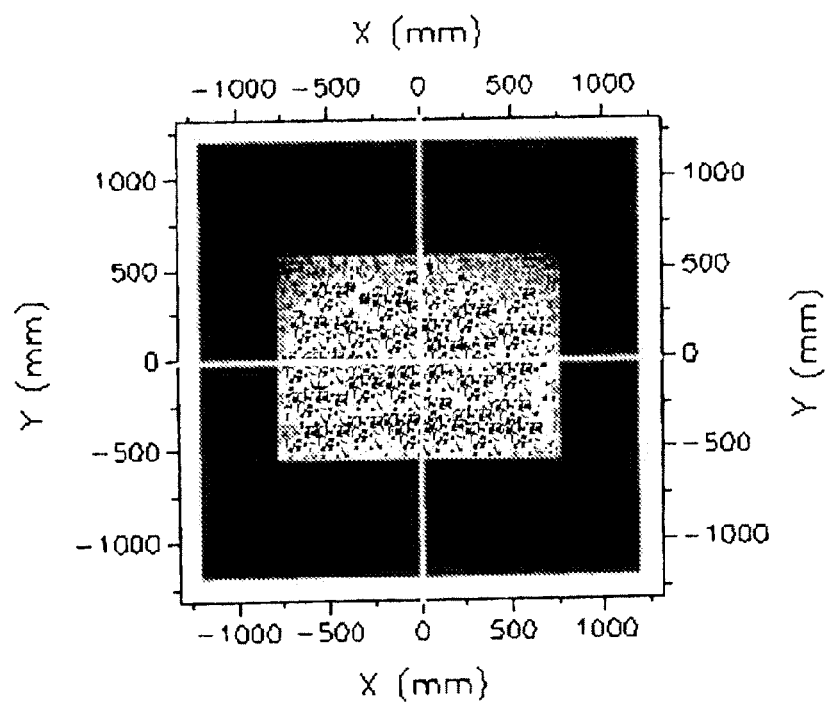
FIG. 8A is a schematic view showing an illuminance profile on a projection screen in the system shown in FIG. 6.

FIG. 8A shows the illuminance profile on a projection screen in the system shown in FIG. 6. In FIG. 8A, a Y axis corresponds to the vertical direction (up-and-down direction shown) of the projection screen, and an X axis corresponds to the horizontal direction (left-and-right direction shown) of the projection screen. In the Y axis and the X axis, the position of the center (center of gravity) of the projection screen is 0.

Figure 8B:
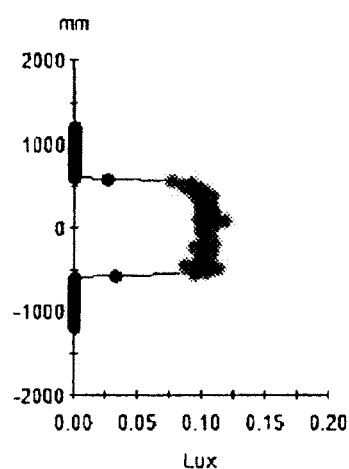
FIG. 8B is a characteristic view showing a change of luminance in a Y axis direction when a value in an X axis is 0 in the illuminance profile shown in FIG. 8A.
Figure 8C:
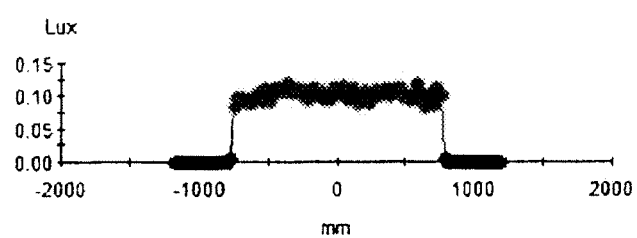
FIG. 8C is a characteristic view showing a change of luminance in the X axis direction when a value in the Y axis is 0 in the illuminance profile shown in FIG. 8A.

FIG. 8B is a characteristic view showing a change of luminance in the Y axis direction when the value in the X axis is 0. FIG. 8C is a characteristic view showing a change of luminance in the X axis direction when the value in the Y axis is 0. As can be understood from these characteristic views, an image of almost uniform luminance can be acquired on the entire projection screen.

In the projection display device shown in FIG. 5, illumination devices 81 and 83 are similar in configuration and condition to illuminating device 82, and hence the liquid crystal panel can be illuminated uniformly with highly efficiently polarized and converted linear polarized light. Thus, according to the projection display device, a very bright projection screen having a wide color reproduction range can be acquired.

The illuminating device according to the present embodiment can be easily applied to, in addition to the three-plate liquid crystal projector, a single-plate liquid crystal projector. In this case, in the system shown in FIG. 6, cross dichroic prism 111 is omitted, and a LED referred to as "3 in 1" having light emitting parts of red, blue, and green housed in one package is used for light source 101. Such a LED can be easily acquired. For display element 22, a liquid crystal panel where pixels include color filters of red, green, and blue is used. In such a case, a displaying/nondisplaying operation at each pixel is performed in a time-division manner for each color.

Second Exemplary Embodiment

An illuminating device according to the present exemplary embodiment is configured so that lights from a plurality of light sources having peak wavelengths in different wavelength bands enter a light guiding rod. This point is different from the illuminating device according to the first exemplary embodiment. Other components are similar to those of the illuminating device according to the first exemplary embodiment.

Figure 9:
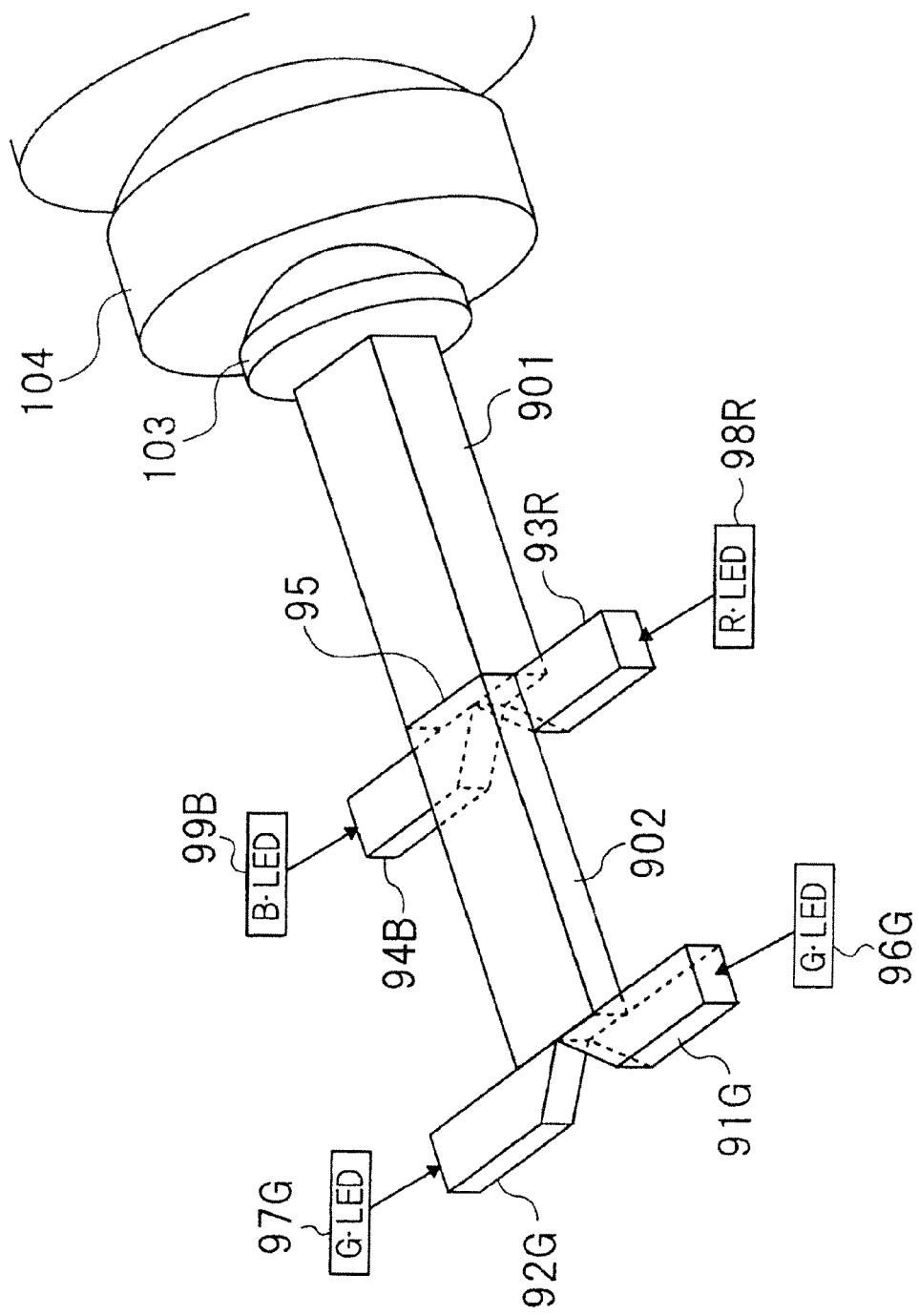
FIG. 9 is a schematic view showing a feature portion of an illuminating device according to a second exemplary embodiment of the present invention.

FIG. 9 is a schematic view showing a feature portion of an illuminating device according to the second exemplary embodiment of the present invention. Referring to FIG. 9, the illuminating device includes light sources 96G and 97G having peak wavelengths in a green wavelength band, light source 98R having a peak wavelength in a red wavelength band, and light source 99B having a peak wavelength in a blue wavelength band. These light sources are solid light sources (e.g., LEDs).

Light from light source 96G enters one end surface (incident surface) of light guiding rod 91G, and light from light source 97G enters one end surface (incident surface) of light guiding rod 92G. Light guiding rods 91G and 92G include rectangular parallelepiped rods and rectangular prisms. One of the two surfaces forming a right angle of the rectangular prism is optically coupled with an end surface opposite the incident surface of the rod, while the other surface is optically coupled with one end surface (incident surface) of light guiding rod 902. The optical coupling means coupling of optical members to enable most of light output from the end surface of one optical member to enter the end surface of the other optical member.

Light from light source 98R enters one end surface (incident surface) of light guiding rod 93R, and light from light source 99B enters one end surface (incident surface) of light guiding rod 94B. Light guiding rods 93R and 94B also include rectangular parallelepiped rods and rectangular prisms. One of the two surfaces forming the right angle of the rectangular prism is optically coupled with the end surface opposite an incident surface of the rod, while the other surface is optically coupled with one end surface (incident surface) of light guiding rod 901.

The other end surface (exit surface) of light guiding rod 902 is optically coupled with the incident surface of light guiding rod 901. In other words, the incident surface of light guiding rod 901 includes first to third regions with which light guiding rods 93R, 94B, and 902 are optically coupled.

Reflecting film 95 serving as a dichroic mirror is formed on the surface (incident surface) of light guiding rod 901 with which light guiding rods 93R, 94B, and 902 are optically coupled.

Figure 10:
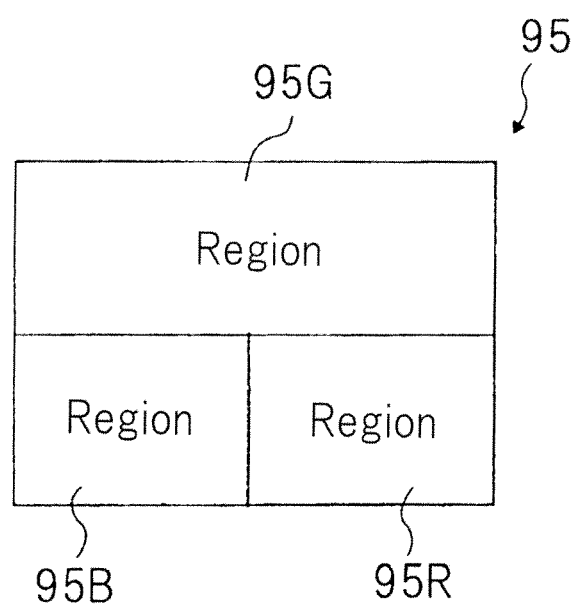
FIG. 10 is a schematic view showing an example of a reflecting film of the illuminating device shown in FIG. 9.

FIG. 10 shows an example of reflecting film 95. As shown in FIG. 10, reflecting film 95 includes three regions 95R, 95G, and 95B that are different from one another in spectral reflectance characteristics (or spectral transmittance characteristics).

Region 95R corresponds to the region of the incident surface of light guiding rod 901 with which light guiding rod 93R is coupled. Region 95R includes a dielectric multilayer film having characteristics of transmitting red light while reflecting green and blue lights.

Region 95G corresponds to the region of the incident surface of light guiding rod 901 with which light guiding rod 902 is coupled. Region 95G includes a dielectric multilayer film having characteristics of transmitting green light while reflecting red and blue lights.

Region 95B corresponds to the region of the incident surface of light guiding rod 901 with which light guiding rod 94B is coupled. Region 95B includes a dielectric multilayer film having characteristics of transmitting blue light while reflecting red and green lights.

Illumination lenses 103 to 107, phase plate 108, reflective polarizing plate 109, and display element 22 are arranged in the traveling direction of light output from an end surface (exit surface) opposite the incident surface of light guiding rod 901. Illumination lenses 103 to 107, phase plate 108, reflective polarizing plate 109, and display element 22 are similar to those of the first exemplary embodiment.

The center axis of light guiding rod 901 matches the optical axis (optical axis A shown in FIG. 1) of the optical system including illumination lenses 103 to 107. The center axis of light guiding rod 902 does not match the center axis of light guiding rod 901.

The center of the light emitting part of light source 96G matches the center axis of the rod part of light guiding rod 91G. The center (corresponding to the center axis of the rod part) of the exit surface of light guiding rod 91G does not match the center axis of light guiding rod 902.

The center of the light emitting part of light source 97G matches a center axis of a rod part of light guiding rod 92G. The center (corresponding to the center axis of the rod part) of the exit surface of light guiding rod 92G does not match the center axis of light guiding rod 902.

The center of the light emitting part of light source 98R matches the center axis of the rod part of light guiding rod 93R. The center (corresponding to the center axis of the rod part) of the exit surface of light guiding rod 93R does not match the center axis of light guiding rod 901.

The center of the light emitting part of light source 99B matches the center axis of the rod part of light guiding rod 94B. The center (corresponding to the center axis of the rod part) of the exit surface of light guiding rod 94B does not match the center axis of light guiding rod 901.

Next, operation of the illuminating device according to the present embodiment is described.

Colored light (green) emitted from light source 96G enters the incident surface of light guiding rod 902 via light guiding rod 91G, and colored light (green) emitted from light source 97G enters the incident surface of light guiding rod 902 via light guiding rod 92G. In light guiding rod 902, the colored lights (green) from light sources 96G and 97G are propagated in the rod to exit from the exit surface.

The colored light (green) output from the exit surface of light guiding rod 902 enters region 95G of reflecting film 95. Green light is transmitted through region 95G. Thus, the colored light (green) output from the exit surface of light guiding rod 902 is transmitted through region 95G to enter the rod from the incident surface of light guiding rod 901.

Colored light (red) output from light source 98R enters region 95R of reflecting film 95 via light guiding rod 93R. Red light is transmitted through region 95R. Thus, the colored light (red) output from light guiding rod 93R is transmitted through region 95R to enter the rod from the incident surface of light guiding rod 901.

Colored light (blue) output from light source 99B enters region 95B of reflecting film 95 via light guiding rod 94B. Blue light is transmitted through region 95B. Thus, the colored light (blue) output from light guiding rod 94B is transmitted through region 95B to enter the rod from the incident surface of light guiding rod 901.

In light guiding rod 901, incident red, green, and blue lights are propagated in the rod to exit from the exit surface. The red, green, and blue colors are made uniform in luminance during propagation in light guiding rod 901, and are mixed.

Luminous fluxes (red, green, and blue) of unpolarized light output from the exit surface of light guiding rod 901 are sequentially passed through illumination lenses 103, 104, 105, 106, and 107 and phase plate 108 to reach reflective polarizing plate 109. Reflective polarizing plate 109 transmits, among the luminous fluxes (unpolarized light) passed through phase plate 108, the first linear polarized light (e.g., p-polarized light) while reflecting the second linear polarized light (e.g., s-polarized light) toward phase plate 108.

The first linear polarized lights (red, green, and blue) transmitted through reflective polarizing plate 109 are applied to the display surface (display panel) of display element 22. On the other hand, the second linear polarized lights (red, green, and blue) reflected by reflective polarizing plate 109 are sequentially passed through phase plate 108 and illumination lenses 107, 106, 105, 104, and 103 to enter the exit surface of light guiding rod 901.

Reflected lights (red, green, and blue) from reflective polarizing plate 109, which have entered the exit surface of light guiding rod 901, are propagated while being repeatedly reflected on the rod inner surface to reach reflecting film 95 formed on the incident surface. In light guiding rod 901, the reflected lights (red, green, and blue) are separated by colors during propagation in the rod. Among the colored lights that have separated, red and blue lights enter region 95G of reflecting film 95, while green light enters regions 95R and 95B of reflecting film 95. In this case, as new light source images (surface light source images), the secondary surface light source image of red and the secondary surface light source image of blue are formed in region 95G, and the secondary surface light source image of green is formed in regions 95R and 95B.

In region 95G, red and blue lights are reflected. In regions 95R and 95B, green light is reflected. The reflected lights (red and blue) from region 95G and the reflected light (green) from regions 95R and 95B enter the incident surface of light guiding rod 901 again.

In light guiding rod 901, the reflected lights (red, green, and blue) from reflecting film 95 are propagated in the rod to exit from the exit surface. Red, green, and blue lights are made uniform in luminance during propagation in light guiding rod 901, and are mixed.

Luminous fluxes (circular polarized lights) from the new light sources (red, green, and blue), which have been output from the exit surface of light guiding rod 102, are sequentially passed through illumination lenses 103, 104, 105, 106, and 107 and phase plate 108 to reach reflective polarizing plate 109.

Among the lights reflected by reflective polarizing plate 109, light that has twice passed through phase plate 108 (¼ wavelength plate) during the process of reaching reflecting film 95 from reflective polarizing plate 109 and during the process of reaching reflective polarizing plate 109 from reflecting film 95, becomes linear polarized light where the polarizing direction changes by 90 degrees as compared with the polarizing direction when light is reflected by reflective polarizing plate 109. Thus, most of the luminous flux (circular polarized light) from reflecting film 95 is converted into first polarized light (p-polarized light) at phase plate 108. The first polarized light (p-polarized light) is passed through reflective polarizing plate 109 to reach display element 22.

As described above, according to the illuminating device of the present embodiment, for each of the red, green, and blue light sources, among the lights from the light source, the light reflected by reflective polarizing plate 109 can be efficiently returned to reflecting film 95, and reflected by reflecting film 95 to be used again. Thus, display element 22 can be uniformly illuminated with highly efficiently polarized and converted linear polarized lights (red, green, and blue).

When the illuminating device according to the present embodiment is applied to a projection display device, a projection optical system is located in the traveling direction of the light passed through display element 22. Display element 22, which is, for example, a liquid crystal panel, can display images corresponding to red, green, and blue in a time-division manner. Light sources 96G, 97G, 98R, and 99B are lit in time division for the respective colors, and display element 22 is driven in synchronization with the lighting time thereof. The red, green, and blue images displayed on display element 22 in time division are projected on a screen by the projection optical system.

In the illuminating device according to the present embodiment, the number of light sources of each of red and blue is one, while the number of green light sources is two. The reason is briefly described below.

Generally, the light output of a green LED is smaller than that of a red or blue LED. Thus, when the red, green, and blue LEDs are each used individually, and colored lights (red, green, and blue) from the respective color LEDs are synthesized to acquire white light having excellent white balance, the output of the red and blue LEDs must be suppressed to match the relatively small light output of the green LED. In this case, the luminance of the acquired white light is reduced by an amount equal to the suppressed output of the red and blue LEDs.

In the illuminating device according to the present embodiment, two green LEDs relatively small in light output are used, and hence the output of the red and blue LEDs can be controlled according to the luminance acquired when colored lights from the two green LEDs are combined. In this case, the output of the red and blue LEDs can be larger than that when only one green LED is used, and the luminance of acquired white light can accordingly be higher.

According to the present embodiment, a light guiding rod is used as means for entering lights from light sources 96G, 97G, 98R, and 99B to the incident surface of light guiding rod 901. This configuration enables, when relatively large LED modules are used as light sources 96G, 97G, 98R, and 99B, arrangement of the LED modules on the incident surface of light guiding rod 901 as if they are close to one another.

The illuminating device and the projection device according to the embodiments described above are only examples of the present invention. The configurations thereof can be appropriately changed within the spirit and the scope of the present invention.

For example, the illuminating device according to the first exemplary embodiment can use a plurality of light sources for light source 101. When the plurality of light sources is used, a light guiding rod is used as means for entering lights from the light sources to the incident surface of light guiding rod 102. For example, illuminating device 82 shown in FIGS. 5 and 6 uses light sources 96G and 97G shown in FIG. 9 for light source 101. In this case, the light from light source 96G is entered to the incident surface (opening 31) of light guiding rod 102 by light guiding rod 91G, and the light from light source 97G is entered to the incident surface (opening 31) of light guiding rod 102 by light guiding rod 92G. Opening 31 includes the first region with which light guiding rod 91G is optically coupled, and the second region with which light guiding rod 92G is optically coupled.

The illuminating device shown in FIG. 1 can include lens means for entering the light from light source 101 to the incident surface of light guiding rod 102.

In the configuration shown in FIG. 1, the light from light source 101 enters one of the two regions divided by the straight line that passes through the center of gravity of the incident surface of light guiding rod 102. However, the present invention is not limited to this. For example, the illuminating device can be configured such that the light emitting center of light source 101 is shifted from the center axis of light guiding rod 102, and at least a part of the reflected light from reflective polarizing plate 109 is reflected by reflecting film 21.

In the configuration shown in FIG. 1, another light source having a peak wavelength in the color wavelength band of light source 101 can be included. In this case, lights from light source 101 and another light source enter one of the above two regions of the incident surface of light guiding rod 102.

The illuminating device can use the first light source having a peak wavelength in the first color wavelength band for light source 101, and may further include the second light source having a peak wavelength in a the second color wavelength band different from the first color, and the third light source having a peak wavelength in the third color wavelength band different from the first and second colors. In this case, the incident surface of light guiding rod 102 includes first and second regions divided by a straight line that passes through the center of gravity of the surface, and the second region includes third and fourth regions divided by another straight line intersecting the straight line that passes through the center of gravity of the incident surface. Colored light from the first light source enters the first region, colored light from the second light source enters the third region, and colored light from the third light source enters the fourth region. Reflecting film 21 includes first to third reflecting films. The first reflecting film is formed in the first region to transmit the first colored light while reflecting the second and third colored lights. The second reflecting film is formed in the third region to transmit the second colored light while reflecting the first and third colored lights. The third reflecting film is formed in the fourth region to transmit the third colored light while reflecting the first and second colored lights. The first to third colors can correspond to three primary colors of light, namely, red, green, and blue.

In this case, the illuminating device can include first light guiding means for causing the light from the first light source to enter the first region, second light guiding means for causing the light from the second light source to enter the third region, and third light guiding means for casing the light from the third light source to enter the fourth region.

What is claimed is:

1. An illuminating device comprising:
   a light source;
   a light guiding unit where light from the light source is supplied to one end surface, and light incident from the one end surface is propagated inside to exit from the other end surface;
   an illuminating optical system that forms an optical image formed on the other end surface of the light guiding unit on a display element;
   a reflective polarizing plate that is located between the illuminating optical system and the display element, and transmits a first polarized light while reflecting a second polarized light whose polarized state is different from the first polarized light toward the illuminating optical system;
   a phase plate that is located between the light guiding unit and the reflective polarizing plate; and
   a reflecting element that is disposed on a side opposite the one end surface of the light guiding unit and that reflects, among lights reflected by the reflective polarizing plate, light incident via the phase plate, the illuminating optical system, and the light guiding unit toward the one end surface of the light guiding unit,
   wherein a center axis that passes through a center of gravity of both end surfaces of the light guiding unit matches an optical axis of the illuminating optical system, and a light emitting center of the light source is shifted from the center axis of the light guiding unit;
   wherein the light from the light source enters one of two regions of the one end surface of the light guiding unit, the two regions being divided by a straight line that passes through a center of gravity of the one end surface;
   the light source being a first light source having a peak wavelength in a first color wavelength band, the illuminating device further comprising:
   a second light source having a peak wavelength in a second color wavelength band different from the first color; and
   a third light source having a peak wavelength in a third color wavelength band different from the first and second colors,
   wherein one end surface of the light guiding unit includes first and second regions divided by the straight line, and the second region includes third and fourth regions divided by another straight line that intersects the straight line and that passes through the center of gravity of the one end surface,
   wherein a colored light from the first light source enters the first region, a colored light from the second light source enters the third region, and a colored light from the third light source enters the fourth region, and wherein the reflecting element includes:

a first reflecting film that is formed in the first region to transmit the first colored light while reflecting the second and third colored lights;

a second reflecting film that is formed in the third region to transmit the second colored light while reflecting the first and third colored lights; and a third reflecting film that is formed in the fourth region to transmit the third colored light while reflecting the first and second colored lights.

2. The illuminating device according to claim 1, further comprising:

a first light guiding unit that causes the light from the first light source to enter the first region;

a second light guiding unit that causes the light from the second light source to enter the third region; and a third light guiding unit that causes the light from the third light source to enter the fourth region.

3. The illuminating device according to claim 1, wherein the first light source includes two green LEDs having peak wavelengths in a green wavelength band;

the second light source includes a red LED having a peak wavelength in a red wavelength band; and the third light source includes a blue LED having a peak wavelength in a blue wavelength band.

4. The illuminating device according to claim 3, further comprising:

a first light guiding unit where a colored light from one of the two green LEDs is supplied to one end surface;

a second light guiding unit where a colored light from the other of the two green LEDs is supplied to one end surface;

a third light guiding unit where the other end surfaces of the first and second light guiding units are optically coupled with one end surface;

a fourth light guiding unit where a colored light from the red LED is supplied to one end surface; and a fifth light guiding unit where a colored light from the blue LED is supplied to one end surface, wherein the other end surfaces of the third to fifth light guiding units are optically coupled with one end surface of the light guiding unit.

5. A projection display device comprising:

an illuminating device;

a display element that is illuminated with light from the illuminating device; and a projection optical system that projects image light from the display element, wherein the illuminating device includes:

a light source;

a light guiding unit where light from the light source is supplied to one end surface, and light incident from the one end surface is propagated inside to exit from the other end surface;

an illuminating optical system that forms an optical image formed on the other end surface of the light guiding unit on the display element;

a reflective polarizing plate that is located between the illuminating optical system and the display element, and transmits first polarized light while reflecting second polarized light whose polarized state is different from the first polarized light toward the illuminating optical system;

a phase plate that is located between the light guiding unit and the reflective polarizing plate; and a reflecting element that is disposed on a side opposite the one end surface of the light guiding unit and that reflects, among lights reflected by the reflective polarizing plate, light incident via the phase plate, the illuminating optical system, and the light guiding unit toward the one end surface of the light guiding unit, wherein a center axis that passes through a center of gravity of both end surfaces of the light guiding unit matches an optical axis of the illuminating optical system, and a light emitting center of the light source is shifted from the center axis of light guiding unit; another light source having a peak wavelength in a color wavelength band of the light source, wherein lights from the light source and the another light source enter one of the two regions of one end surface of the light guiding unit.

6. An illuminating device comprising:

a light source;

a light guiding unit where light from the light source is supplied to one end surface, and light incident from the one end surface is propagated inside to exit from the other end surface;

an illuminating optical system that forms an optical image formed on the other end surface of the light guiding unit on a display element;

a reflective polarizing plate that is located between the illuminating optical system and the display element, and transmits a first polarized light while reflecting a second polarized light whose polarized state is different from the first polarized light toward the illuminating optical system;

a phase plate that is located between the light guiding unit and the reflective polarizing plate; and a reflecting element that is disposed on a side opposite the one end surface of the light guiding unit and that reflects, among lights reflected by the reflective polarizing plate, light incident via the phase plate, the illuminating optical system, and the light guiding unit toward the one end surface of the light guiding unit, wherein a center axis that passes through a center of gravity of both end surfaces of the light guiding unit matches an optical axis of the illuminating optical system, and a light emitting center of the light source is shifted from the center axis of the light guiding unit;

wherein the light from the light source enters one of two regions of the one end surface of the light guiding unit, the two regions being divided by a straight line that passes through a center of gravity of the one end surface;

wherein the reflecting element comprises a reflecting film formed in the other of the two regions of the one end surface of the light guiding unit;

another light source having a peak wavelength in a color wavelength band of the light source, wherein lights from the light source and the another light source enter one of the two regions of one end surface of the light guiding unit.

* * * * *